J. T. STONEY.

MOLDING MACHINE.

APPLICATION FILED MAY 15, 1914.

Reissued Feb. 8, 1916.

14,059.

3 SHEETS—SHEET 1.

Witnesses.
E. B. Filchner
A. J. Hudson

Inventor
John T. Stoney
by Thurston & Fuig
attys.

J. T. STONEY.

MOLDING MACHINE.

APPLICATION FILED MAY 15, 1914.

Reissued Feb. 8, 1916.

14,059.

3 SHEETS—SHEET 2.

Witnesses.
E. B. Filchrist
A. J. Hudson

Inventor
John T. Stoney
by Thurston & Hunt
attys

J. T. STONEY.

MOLDING MACHINE.

APPLICATION FILED MAY 15, 1914.

Reissued Feb. 8, 1916.

14,059.

3 SHEETS—SHEET 3.

Witnesses
E. B. Filchner
A. J. Hudson

Inventor
John T. Stoney
by Thurston & Fritz
attys

NORRIS PETERS, INC., LITHO., WASHINGTON, D. C.

UNITED STATES PATENT OFFICE.

JOHN T. STONEY, OF CLEVELAND, OHIO.

MOLDING-MACHINE.

Specification of Reissued Letters Patent. Reissued Feb. 8, 1916.

14,059.

Original No. 1,004,602, dated October 3, 1911, Serial No. 600,906. Application for reissue filed May 15, 1914. Serial No. 838,888.

*To all whom it may concern:*

Be it known that I, JOHN T. STONEY, a citizen of the United States, residing at Cleveland, in the county of Cuyahoga and State of Ohio, have invented new and useful Improvements in Molding-Machines, of which the following is a specification.

This invention relates to machines for the making of molds and cores and provides a machine in which the material from which the mold or core is made may be subjected to a jarring motion to compact it, and subsequently the patterns are withdrawn from the mold or the core from the core box.

Generally speaking, the invention comprises the elements and combinations thereof set forth in the accompanying claims.

Reference should be had to the accompanying drawings, in which—

Figure 1:
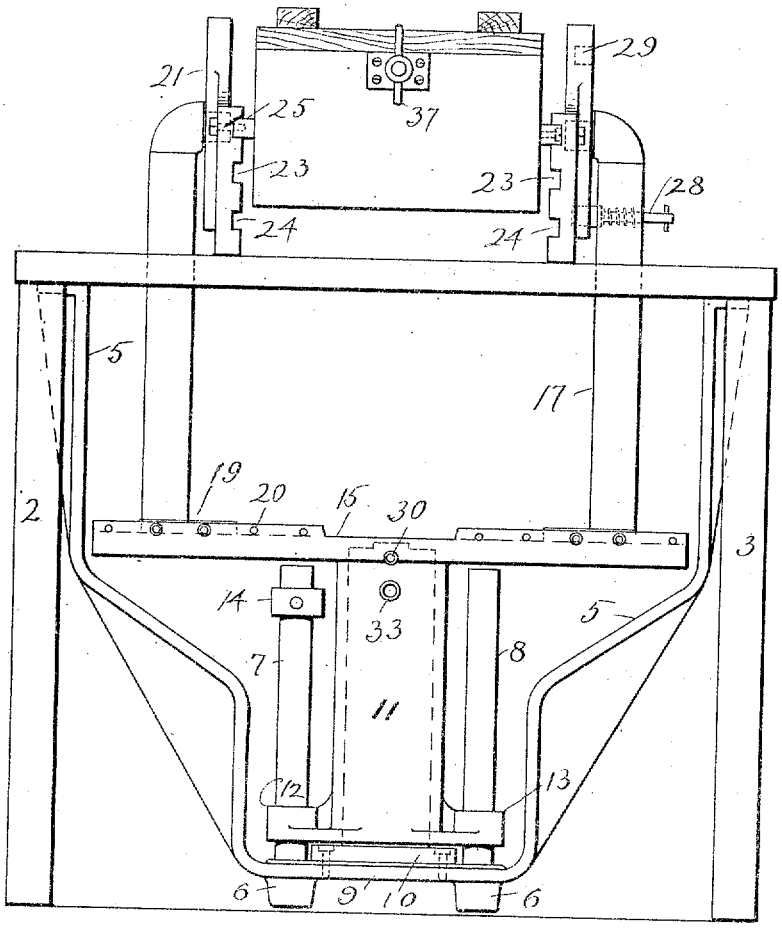
Figure 2:
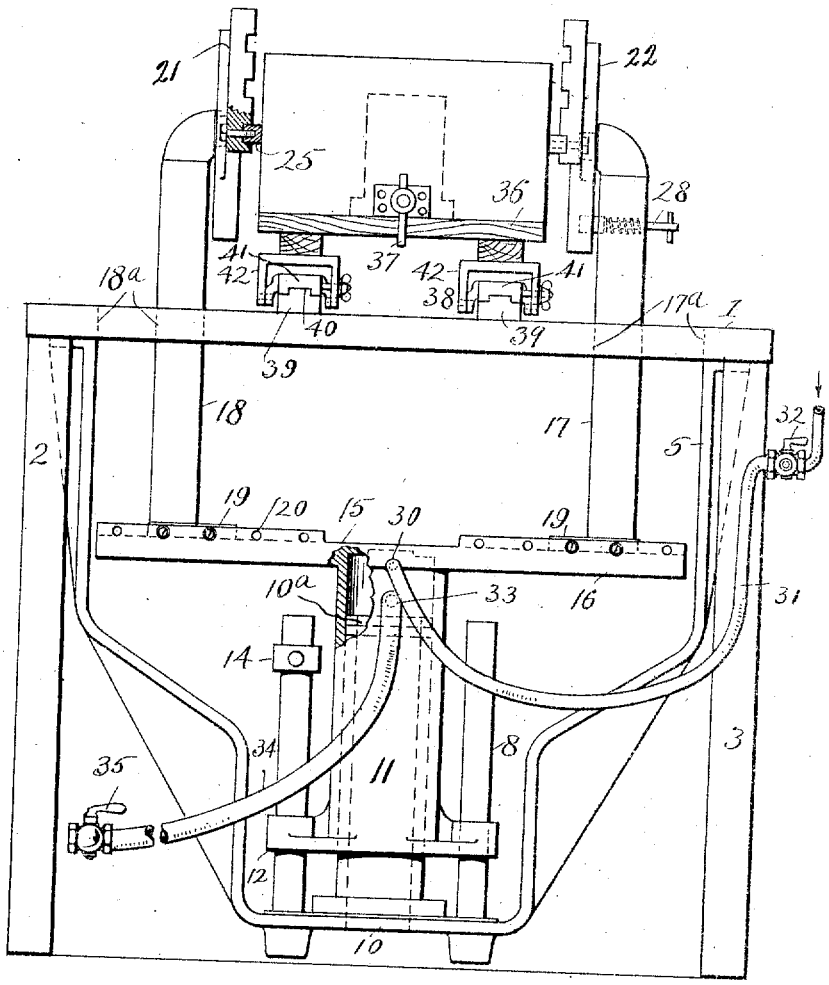
Figure 3:
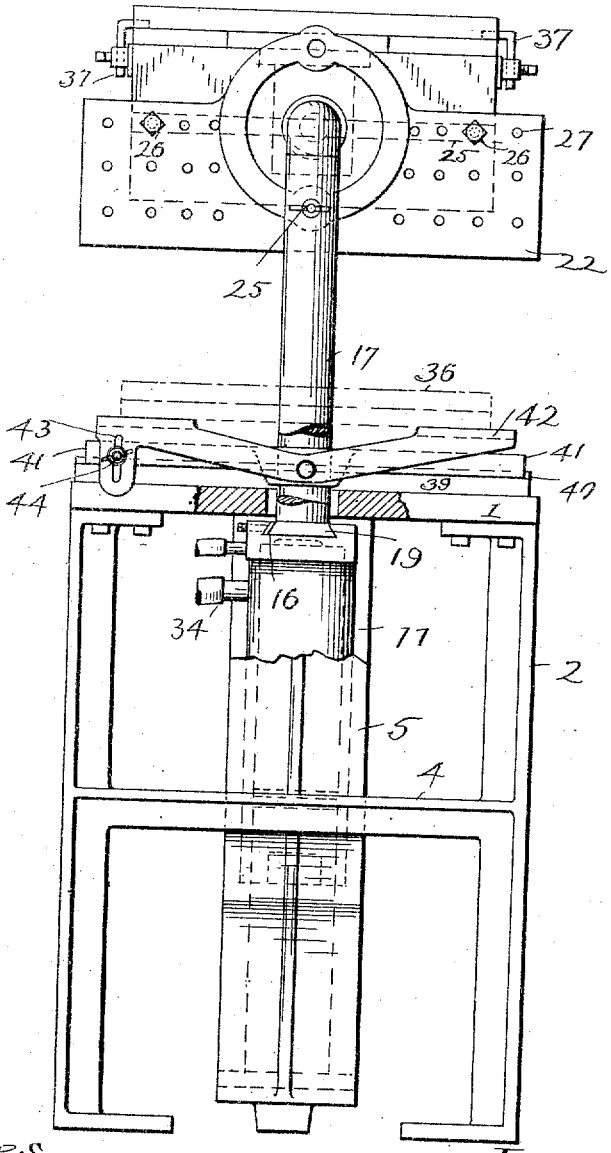

Figure 1 is a front elevation of the machine in position to jar the mold; Fig. 2 is a front elevation with portions in section of the machine in position just before the pattern or core box is withdrawn; Fig. 3 is a side elevation with portions in section showing the mold or core box in elevated position before being rolled over.

As indicated in the opening paragraph of the specification, this machine is applicable equally to the making of molds from sand or other material, or to making cores.

A platform 1 is supported at its ends upon upright members 2 and 3, which may assume any desired shape. These side members are provided with central cross members such as shown at 4 in Fig. 3. A bracket 5 which assumes the general form shown in Figs. 1 and 2 is secured at its opposite ends upon the upright end pieces 2 and 3 and depends between the same, being of such height as to just clear the floor or platform upon which the machine may rest. Upon the lower portion of the bracket 5 are depending bosses 6 which may be threaded or otherwise prepared to receive uprights 7 and 8.

Upon the portion of the bracket 5, indicated at 9, an upright cylindrical member 10 is bolted or otherwise secured. This cylindrical member may be hollow or solid, as desired, but in the drawings I have indicated it as hollow. For convenience I shall call the member 10 a piston. Surrounding the upright piston 10 is a cylinder 11 which at its lower end is provided with extending bosses 12 and 13, which bosses are provided with openings to engage with the members 7 and 8 for the purpose of guiding the cylinder 11 in its movements. The member 7 carries a stop member 14 which may be adjusted upon the member 7 so as to limit the upward movement of the cylinder 11. If desired, an additional stop member may be placed upon the member 8. A packing ring $10^a$ is carried by the piston 10 which prevents the leakage of fluid between the contacting surfaces of piston 10 and cylinder 11. At its upper end the cylinder 11 carries a platform 15. The upper surface of this platform is provided with an undercut groove 16, more clearly shown in Fig. 3. Two uprights 17 and 18 are provided with base portions 19 which are formed with slanting sides in a manner to complement the groove 16 and are adapted to slide in this groove. Openings 20 are provided in the table 15 through which bolts or other members may be inserted to engage with the uprights 17 and 18, for the purpose of holding the uprights in any adjusted position in the groove 16. The uprights 17 and 18 extend through slots formed in the table, the positioning and extent of the slots is indicated at $17^a$ and $18^a$ in Fig. 2. The bolts are but indicative of any suitable means to hold the uprights in position.

The uprights 17 and 18 may be moved toward and from the center of the machine, and, by proper adjustment, may be made to accommodate a flask of any width within the limits of the machine. This adjustable feature provides a more universal machine, which is particularly desirable in a small molding machine.

At their upper ends, the members 17 and 18 are provided with suitable trunnions upon which are pivotally mounted the members 21 and 22, which, as will be clear from Fig. 3, are rectangular plates. These plates are provided with grooves, such as shown at 23 and 24, and the grooves are adapted to receive extending ribs 25 which may be formed directly upon a flash or core box or the ribs may be otherwise provided. These projecting members 25 are held from slipping or sliding in the grooves by means of bolts 26 which extend through suitable openings, such as illustrated at 27 in the plates 21 and 22. By the structure just described, it is possible to use flasks or core boxes of varying height and to so adjust them that when the machine is in jarring position, the flash will be elevated from the table. A stop pin 28 extends through one of the uprights 17 and engages with a depression formed in the member 22. This stop pin may be of any desired construction and is adapted to hold the flash or core box against swinging when in adjusted position. A second depression 29 is indicated in Fig. 1, with which the pin will coöperate when the flask or core box is in a position the reverse to that shown in Fig. 1, viz. that shown in Fig. 2.

An air port 30 is located in the table 15, or the upper part of the cylinder 11, through which port air or other compressed fluid is admitted to the interior of the cylinder 11 and the piston 10. As a suitable means for introducing the fluid, I have shown a flexible pipe 31 which may be controlled by a valve 32. In the cylinder 11, below the port 30, another port 33 is located which is connected with a suitable outlet pipe 34, which pipe is likewise controlled by a valve 35.

In operation compressed air or other fluid will be admitted through the port 30 which will cause the cylinder 11 and the parts carried thereby to be elevated. However, when the port 33 rises beyond the top of the member 10, the air will exhaust through the port 33 and pipe 34, allowing the cylinder 11, and the parts carried thereby to drop or return to their initial position. As soon as this dropping takes place, the port 33 will again be covered and the pressure within the members 10 and 11 will again raise the clyinder 11 and the parts carried thereby. This operation will be rapidly repeated and thereby impart to the mechanism carried by the cylinder 11 a vibrating motion. If the valve 35 is turned so as to close the pipe 34, then as air is admitted through the pipe 31, the cylinder 11 and the parts carried thereby will be raised until such time as the valve 32 is closed or the boss 12 contacts with the stop 14. The machine as shown in Fig. 1, is in proper position for jarring the mold or pattern box. That is to say, the plates 21 and 22 rest upon the table 1, and as the cylinder 11 is raised and lowered, these plates are raised from and contact with the table 1 and thereby jar the material within the mold or the pattern box. When it is desired to draw the pattern or the core, the mold or core box is raised, as suggested in Fig. 3 and is turned over to the position shown in Fig. 2. It is then lowered until the board 36 rests upon the table 1 or upon suitable devices adapted to receive the board 36. Then the clamps 37 are removed and the flask or core box, as the case may be, is elevated. This elevation is accomplished, as before stated, by admitting air through the pipe 31 and closing the valve 35.

It frequently happens that the board 36 is not perfectly level, and therefore would not rest squarely upon the table 1. In order to provide for such contingency as this, I may use the devices such as indicated generally at 38, which are adapted to receive the board 36 and to automatically equalize, so as to support the opposite ends of the board. These devices consist of a base portion 39 which is provided with a tongue 40. A slide 41 is provided with a groove complementary with respect to the tongue 40 so that as the member 41 slides upon the member 40, it will be guided in its movements. At substantially the central portion of the member 41 there is pivoted a support 42, so that the support may rock about its pivot. When the mold or core box is lowered and the board 36 rests upon the members 42, they being free to move, will rock to such position that the board 36 is supported at both its ends.

For the purpose of holding the rocker members 42 in their final position, I have provided a slot 43 in the rocker members 42, through which extends a screw bolt 44, which screw bolt engages with a suitable opening in the slide 41. As soon as the rockers 42 have assumed their final position, the mold or core may be pulled out from beneath the devices carried by the plates 22 and 21. In this operation, the parts 41 slide upon the parts 40 and thus make it easy to remove a heavy mold or core with a minimum chance of damage to the article which is being handled. As soon as the mold or core is removed from beneath the box, it may then be removed from the rockers 42, and these rockers may be returned to proper position to receive another mold or core.

Having thus described my invention, what I claim is:

1. In a molding machine, the combination with a suitable stationary table, of a piston supported beneath said table, a cylinder sliding upon said piston, members carried by said cylinder and extending above said table, means carried by said members for engaging and supporting the opposite sides of a mold and adapted to jar against the said table.

2. In a molding machine, the combination with a table, of a mold-holding device adapted to jar upon said table, a jarring mechanism beneath the table, which mechanism carries the said holding device, and means for adjusting the mold holding device to accommodate molds of various widths.

3. In a molding machine, the combination with a suitable stationary table, of a piston supported beneath said table, a cylinder sliding upon said piston, upright members carried by said cylinder and adjustable toward and from each other, said members extending above the table, means carried by the said members for engaging and supporting the opposite sides of a mold and adapted to jar against the said table.

4. A molding machine comprising a stationary table, a piston supported beneath said table, a cylinder sliding upon said piston, means for admitting a fluid between the piston and cylinder to raise the latter, an exhaust port carried by the cylinder near the upper portion thereof and adapted to be uncovered as the cylinder is raised upon the piston, whereby a vibrating motion is imparted to the cylinder, a mold supporting means carried by the said cylinder and adapted to impinge against the table as the cylinder is vibrated.

5. A molding machine comprising a stationary table, means for supporting the table, a bracket supported by the table, a piston carried by the said bracket, a cylinder surrounding the piston, means for admitting air between the piston and cylinder, an outlet port carried by the cylinder and adapted to be uncovered as the cylinder is raised to impart a vibratory motion to the cylinder, a mold supporting means carried by the said cylinder, said means being adapted to impinge against the table as the cylinder is vibrated.

6. In a molding machine, the combination with a vibrating mechanism, of a platform carried by the said vibrating mechanism, uprights mounted upon the said platform, said uprights being adjustable upon the platform, pivoted members carried by the said uprights to which the flask or core box may be secured, the same being adapted to impinge against the table as the cylinder is vibrated.

7. In a molding machine, the combination with a vibrating mechanism of a platform carried by the vibrating mechanism, uprights secured upon the platform, swinging plates secured upon the said uprights, said plates being provided with grooves adapted to receive projecting members upon the flask or core box, and means for securing the said projecting members in adjusted position with respect to the grooves.

8. In a molding machine, the combination with a jarring mechanism having a part which is movable, a pair of mold supports mounted upon that part of the jarring mechanism which is movable, said supports being adjustable toward and from each other.

9. In a molding machine, the combination with a jarring cylinder member and a piston member which are relatively movable, oppositely disposed mold supporting devices mounted upon that one of said members which moves, said supporting devices being slidably mounted, thereby to be adjustable toward and from each other.

10. In a molding machine, the combination with a jarring mechanism having a part which is movable, a pair of mold supports mounted upon that part of the jarring mechanism which is movable, said supports being adjustable toward and from each other, plates pivotally mounted at the upper end of said supporting devices and adapted to support the mold.

11. In a molding machine, the combination with a platform, means for raising and lowering said platform, a pair of supporting members adjustable upon said platform toward and from the center thereof, and means carried by said supporting members for engaging and holding the mold.

12. In a molding machine, the combination with a platform, means for raising and lowering said platform, a pair of upright members mounted upon said platform, said members being adjustable upon said platform, there being coöperating guiding means on the platform, and uprights, said uprights at their upper ends being adapted to support a mold.

13. In a molding machine, the combination with a raising and lowering mechanism having a part which is movable; of oppositely disposed mold supports carried by the movable part of said mechanism, said supports being adjustable toward and from each other, and means whereby the mold is rotatably mounted upon the supports.

14. In a molding machine, the combination with a raising and lowering mechanism having a part which is movable; of oppositely disposed upstanding posts, said posts carried by the movable part of said mechanism being adjustable toward and from each other, and means carried by said posts adapted to receive a mold said means being rotatably mounted upon the said posts.

In testimony whereof, I hereunto affix my signature in the presence of two witnesses.

JOHN T. STONEY.

Witnesses:
RAYMOND E. STONEY,
B. P. WILLIAMS.